3,801,575
3-HYDROXYISOTHIAZOLES

Sheldon N. Lewis, Willow Grove, George A. Miller, Glenside, and Andrew B. Law, Levittown, Pa., assignors to Rohm and Haas Company, Philadelphia, Pa.
No Drawing. Application Sept. 3, 1969, Ser. No. 855,046, which is a continuation-in-part of application Ser. No. 672,427, Oct. 3, 1967, which in turn is a continuation-in-part of application Ser. No. 621,766, Mar. 9, 1967, all now abandoned. Divided and this application Jan. 24, 1972, Ser. No. 219,937
Int. Cl. C07d 91/12
U.S. Cl. 260—247.1                                    15 Claims

ABSTRACT OF THE DISCLOSURE

Disclosed herein are certain novel compounds which are most properly designated as substituted 3-hydroxyisothiazoles and salts of 3-hydroxyisothiazoles. These compounds and compositions containing them exhibit a broad spectrum of biocidal properties and are particularly effective for the control of microorganisms.

CROSS-REFERENCES TO RELATED APPLICATIONS

This application is a divisional of copending U.S. Ser. No. 855,046, filed on Sept. 3, 1969, now abandoned, which is in turn a continuation-in-part of U.S. Ser. No. 672,427, filed on Oct. 3, 1967, now abandoned, which is in turn a continuation-in-part of U.S. Ser. No. 621,766, filed on Mar. 9, 1967, now abandoned.

This invention relates to novel substituted 3-hydroxyisothiazoles (hereinafter referred to at times as "isothiazoles" or "hydroxyisothiazoles"), to biocidal compositions containing them and to their utilization in the control of living organisms, and particularly microorganisms.

These novel 3-hydroxyisothiazoles may be represented by the formula

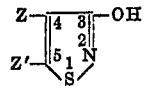

(I)

wherein

Z is hydrogen, lower alkyl, carboxy, lower carbalkoxy, carbamoyl, nitro, halogen, or cyano;

Z', when Z is cyano, carboxy, lower carbalkoxy, or carbamoyl, is hydrogen, lower alkyl, aralkyl of up to 8 carbon atoms, halogen, lower alkylsulfinyl, aralkylsulfinyl of up to 8 carbon atoms, lower alkylsulfonyl, aralkylsulfonyl of up to 8 carbon atoms, lower alkylthio, alkylamino of up to 8 carbon atoms, or aralkylamino of up to 8 carbon atoms;

Z', when Z is nitro, is hydrogen, lower alkyl, aralkyl of up to 8 carbon atoms, or halogen;

Z', when Z is lower alkyl, is hydrogen, lower alkyl, aralkyl of up to 8 carbon atoms, halogen, or lower haloalkyl;

Z', when Z is halogen, is hydrogen, aralkyl of up to 8 carbon atoms, halogen, or lower haloalkyl; and Z', when Z is hydrogen, is an alkyl group of 4 to 12 carbon atoms, aralkyl of up to 8 carbon atoms, halogen or lower haloalkyl.

Where the expression "lower" is employed in conjunction with terms, such as for example, alkyl, alkylsulfinyl, alkylsulfonyl, or haloalkyl, it is intended to indicate that the alkyl portion thereof has a carbon content of 1 to 4 carbon atoms. Typically, the alkyl or alkyl portion may be methyl, ethyl, propyl, isopropyl, butyl, t-butyl and the like.

It should be noted at this point that the bulk of available physical data suggests that Formula I properly designates the isothiazoles of this invention. However, these compounds are tautomeric with their keto-forms which may be represented by the following formula

(II)

For this reason, the isothiazoles can exist in either configuration or as a mixture in any proportion of both forms, and therefore, any reference to either formula herein is intended to include the other.

The 3-hydroxyisothiazoles of the invention can form novel acid and base salts which also exhibit biocidal activity. The novel acid salts of the invention can be represented by the formula

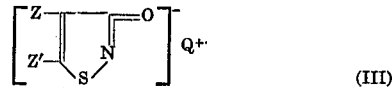

(III)

wherein Z and Z' are as described above, and Q is an alkali, alkaline earth, or transition metal cation; a quaternary ammonium or phosphonium cation; or, a primary, secondary, or tertiary organic base cation.

Among the cations and compounds which Q can represent are inorganic cations such as $Na^+$, $Zn^{++}$, $Cd^{++}$, $Fe^{++}$, $Cu^{++}$, $Co^{++}$, $Ni^{++}$, $Fe^{+++}$, and the like, organic cations such as benzyldimethylalkylammonium, tetramethylammonium, ($\beta$ - hydroxyethylethyl) - trimethylammonium, tetramethylphosphonium, and the like, and organic base catrimethylammonium, tetramethylphosphonium, and the like, and organic base cations such as benzylammonium, morpholinium, N,N'-di-n-decylformamidinium, N,N'-di-t-octylformamidinium, and the like.

The novel base salts of the invention can be represented by the formula

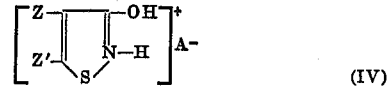

(IV)

wherein Z and Z' are as described above, and A is the anion of a strong inorganic acid or a strong organic acid, such as a carboxylic acid, sulfonic acid, or a phosphonic acid.

Among the anions which A can represent are $Cl^-$, $NO_2^-$, $ClO_4^-$, $SO_4^=$, $HSO_4^-$, $[O_2CCH_2CH_2CO_2]^=$, $[O_2CCO_2]^=$, $Cl_3CCO_2^-$ f-$CH_3C_6H_5SO_3^-$, and the like. When A or Q is multivalent, it will form a salt with any number of isothiazole molecules up to its valence.

Typically, Z may be hydrogen, methyl, ethyl, propyl, isopropyl, butyl, iodo, chloro, bromo, cyano, carboxy nitro, carbamoyl, carbethoxy, carbobutoxy, and the like.

Representative Z' substituents include hydrogen, methyl, ethyl, propyl, isopropyl, butyl, benzyl, chloro, bromo, chloromethyl, chloropropyl, bromomethyl, bromoethyl, methylsulfinyl, ethylsulfinyl, butylsulfinyl, benzylsulfinyl, methylsulfonyl, ethylsulfonyl, propylsulfonyl, benzylsulfonyl, methylthio, n-butylamino, and ethylamino.

Typical compounds which fall within the scope of this invention include, for example:

4-bromo-3-hydroxyisothiazole,
4-chloro-3-hydroxyisothiazole,
5-benzyl-3-hydroxyisothiazole,
5-bromo-3-hydroxyisothiazole,
5-chloro-3-hydroxyisothiazole,
4,5-dichloro-3-hydroxyisothiazole,
4,5-dibromo-3-hydroxyisothiazole,
4-chloro-5-bromo-3-hydroxyisothiazole,
4-bromo-5-chloro-3-hydroxyisothiazole,
4-chloro-5-benzyl-3-hydroxyisothiazole,
4-bromo-5-benzyl-3-hydroxyisothiazole,
4-methyl-3-hydroxyisothiazole,
4-ethyl-3-hydroxyisothiazole,
4-butyl-3-hydroxyisothiazole,
4-methyl-5-ethyl-3-hydroxyisothiazole,
4,5-dimethyl-3-hydroxyisothiazole,
4-methyl-5-chloro-3-hydroxyisothiazole,
4-propyl-5-chloro-3-hydroxyisothiazole,
4-butyl-5-chloro-3-hydroxyisothiazole,
4-methyl-5-bromo-3-hydroxyisothiazole,
4-ethyl-5-bromo-3-hydroxyisothiazole,
4-ethyl-5-benzyl-3-hydroxyisothiazole,
4-propyl-5-benzyl-3-hydroxyisothiazole,
4-cyano-5-methylsulfinyl-3-hydroxyisothiazole,
4-cyano-5-ethylsulfinyl-3-hydroxyisothiazole,
4-cyano-5-benzylsulfinyl-3-hydroxyisothiazole,
4-cyano-5-methylsulfonyl-3-hydroxyisothiazole,
4-cyano-5-butylsulfonyl-3-hydroxyisothiazole,
4-cyano-5-benzylsulfonyl-3-hydroxyisothiazole,
4-carboxy-3-hydroxyisothiazole,
4-carbamoyl-3-hydroxyisothiazole,
4-nitro-3-hydroxyisothiazole,
4-carboxy-5-methylthio-3-hydroxyisothiazole,
4-carbamoyl-5-methylthio-3-hydroxyisothiazole,
4-cyano-5-n-butylamino-3-hydroxyisothiazole,
4-cyano-5-ethylamino-3-hydroxyisothiazole
4-iodo-3-hydroxyisothiazole,
4-cyano-3-hydroxyisothiazole,
4-carbethoxy-3-hydroxyisothiazole,
4-nitro-5-chloro-3-hydroxyisothiazole, and
4-cyano-5-methyl-3-hydroxyisothiazole.

Generally, the isothiazoles disclosed herein may be classified into several types dependent upon their substitutions at the 4 and 5 positions. The preparation of these compounds is more readily followed by means of this classification. These types of compounds are as follows:

(A)

4-halo-3-hydroxyisothiazole
4-halo-5-aralkyl-3-hydroxyisothiazole
4,5-dihalo-3-hydroxyisothiazole (B)

5-halo-3-hydroxyisothiazole
4,5-dihalo-3-hydroxyisothiazole
4-alkyl-3-hydroxyisothiazole
4,5-dialkyl-3-hydroxyisothiazole
4-alkyl-5-halo-3-hydroxyisothiazole (C)

4-alkyl-5-aralkyl-3-hydroxyisothiazole
5-aralkyl-3-hydroxyisothiazole
4-halo-5-aralkyl-3-hydroxyisothiazole
4,5-dialkyl-3-hydroxyisothiazole (D)

4-cyano-5-alkylsulfinyl-3-hydroxyisothiazole
4-cyano-5-aralkylsulfinyl-3-hydroxyisothiazole (E)

4-cyano-5-alkylsulfonyl-3-hydroxyisothiazole
4-cyano-5-aralkylsulfonyl-3-hydroxyisothiazole (F)

4-cyano-3-hydroxyisothiazole
4-carboxy-3-hydroxyisothiazole
4-carbamoyl-3-hydroxyisothiazole
4-nitro-3-hydroxyisothiazole
4-cyano-5-alkyl-3-hydroxyisothiazole
4-carboxy-5-alkyl-3-hydroxyisothiazole
4-carbamoyl-5-alkyl-3-hydroxyisothiazole
4-nitro-5-alkyl-3-hydroxyisothiazole
4-cyano-5-halo-3-hydroxyisothiazole
4-carboxy-5-halo-3-hydroxyisothiazole
4-carbamoyl-5-halo-3-hydroxyisothiazole
4-nitro-5-halo-3-hydroxyisothiazole (G)

4-cyano-5-alkylamino-3-hydroxyisothiazole (H)

4-carbalkoxy-5-alkyl-3-hydroxyisothiazole
4-carbalkoxy-5-halo-3-hydroxyisothiazole
4-carbalkoxy-5-alkylsulfinyl-3-hydroxyisothiazole
4-carbalkoxy-5-alkylsulfonyl-3-hydroxyisothiazole Type A compounds can be prepared by halogenation of 3-hydroxyisothiazole or of substituted 3-hydroxyisothiazoles with a suitable halogenating agent. 3-hydroxyisothiazole is a known compound in the literature and may be synthesized from propiolamide by the method of W. D. Crow and N. J. Leonard, J. Org. Chem., 30, 2660–2665 (1965). Preparation of the substituted 3-hydroxyisothiazoles is set forth under the Type C compounds. Any halogenating agent may be employed in this reaction. Typical halogenating agents include chlorine, bromine, sulfuryl chloride, sulfuryl bromide, N-chlorosuccinimide, N-bromosuccinimide, iodine monochloride, and the like. Bromine and chlorine are preferred halogenating agents. The halogenation reaction is preferably carried out in an inert organic solvent. Aromatic hydrocarbons, halogenated aromatic hydrocarbons, halogenated aliphatic hydrocarbons, ketones, esters and amides are representative of such solvents. The reaction is exothermic and proceeds readily when conducted at about 80° C. to −20° C. or below. Generally, equimolar ratios of the reactants are utilized.

Compounds falling within the type B category can be prepared by the cyclization of a disulfide-amide having the formula

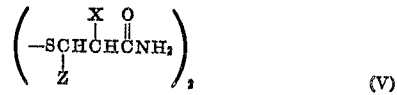

(V)

wherein X and Z are hydrogen or lower alkyl. The cyclization is accomplished by reacting the disulfide-amide with a halogenating agent. Cyclization of the disulfide-amide will take place when 3 mole equivalents of halogenating agent are employed in the reaction. By providing an excess of halogenating agent, the isothiazole may be halogenated at the 4- and/or 5-positions of Formula I. Where 5 mole equivalents of halogenating agent are available, mono-halogenation can be effected. For di-halogenation, 7 mole equivalents of halogenating agent are stoichiometric. Preparation of isothiazoles having the 4- and 5-positions substituted with different halogens is achieved by the halogenation of an isothiazole already halogenated at one of the two positions. For example, if a 4-bromo-5-chloro-3-hydroxyisothiazole is desired, it can be obtained by bromination of a 5-chloro-3-hydroxyisothiazole or the chlorination of a 4-bromo-3-hydroxyisothiazole. The starting 3-hydroxyisothiazole is prepared by the cyclization of a disulfide-amide as described above. The cyclization process will proceed over a broad temperature range and temperature is not critical to the reaction. Generally, the cyclization will be carried out in the range of 0° to 100° C. The reaction is carried out in an inert non-aqueous solvent, such as, for example, benzene, toluene, xylene, ethyl acetate, or ethylene dichloride. In addition, the 4,5-dihalo-3-hydroxy-isothiazoles, may be prepared by in situ halogenation of a 5-halo-3-hydroxyisothiazole, as described for type A compounds.

Type C compounds are prepared by the method of Goerdeler and Mittler as described in Chem. Ber., 96, 944–954 (1963). This involves the halogenation of a substituted β-thioketoamide in an inert organic ester solvent such as ethyl acetate. Such a reaction may be represented by the following equation:

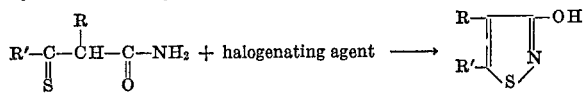

where R is hydrogen or lower alkyl; and R' is aralkyl of up to 8 carbon atoms or lower alkyl.

When two moles of halogenating agent per mole of thioketoamide are employed in the reaction, 4-halo-5-aralkyl-3-hydroxyisothiazoles can be prepared. The reaction proceeds smoothly at a temperature in the range of about 40° to 0° C. or below.

Another process for preparing the type C 5-aralkyl-3-hydroxyisothiazoles is that of Crow and Leonard as set forth in the Journal of Organic Chemistry reference cited above. This method involves the converting of a β-substituted thiocyanoacrylamide or thiosulfatoacrylamide to the hydroxyisothiazole. This reaction may be represented by the following equation:

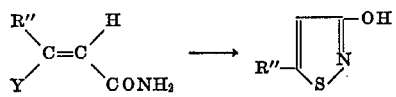

wherein R" is aralkyl of up to 8 carbon atoms and Y is —SCN or —S$_2$O$_3$$^\ominus$. Preferably, conversion of the substituted thiocyanoacrylamide or thiosulfatoacrylamide to the hydroxyisothiazole is achieved by treating the amide with an acid, such as, for example, sulfuric acid. However, when Y is SCN, then transition metal salts, such as nickel sulfate, ferrous sulfate, ferric sulfate, copper sulfate and the like, can also be readily utilized, and when Y is S$_2$O$_3$$^\ominus$, iodine can also be used. Preparation of the thiocyanoacrylamide and thiosulfatoacrylamide as taught by Crow and Leonard is achieved by reacting a substituted propiolamide with thiocyanic acid or thiosulfate.

Type D compounds are prepared by oxidizing a 5-thioalkyl or 5-thioaralkyl-4-cyano-3-hydroxyisothiazole. The latter compound is prepared by the reaction of an alkylhalide or aralkylhalide, such as methyl iodide, ethyl iodide, benzyl chloride, and the like, with 3-hydroxy-5-mercapto-4-cyano-isothiazole dipotassium salt followed by acidification. This process is described in the literature by W. R. Hatchard, J. Org. Chem., 28, 2163–2164 (1963). Oxidizing agents would include, for example, organic peracids such as peracetic, m-chloroperbenzoic, and perphthalic acids or inorganic oxidizing agents such as hydrogen peroxide or nitric acid. The oxidizer is employed in substantially equimolar quantities with the isothiazole. A temperature of 40° C. to 0° C. or below is satisfactory for the reaction which is generally carried out in an inert organic solvent. Representative solvents which may be utilized include aromatic hydrocarbons, aliphatic hydrocarbons, chlorinated aromatic and aliphatic hydrocarbons, ketones, esters, amides and the like.

Type E hydroxyisothiazoles are prepared by the same general methods employed for the preparation of type D compounds except that two moles of oxidizing agent per mole of the 5-thioalkyl or 5 - thioaralkyl - 4-cyano-3-hydroxyisothiazole are required.

Type F compounds can be prepared by reacting the appropriate 4-cyano, 4-carboxy, 4-nitro, or 4-carbamoyl-3-methoxyisothiazole with hydrogen bromide. The 4-cyano-3-methoxyisothiazoles are prepared from 3-methoxyisothiazoles, which are in turn prepared by the cyclization of a disulfide-imidate of the formula

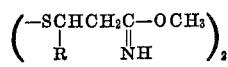

wherein R is hydrogen or an alkyl group, by a process similar to the cyclization of disulfide-amides which is described above as a process for preparing the type B compounds. The 3-methoxyisothiazole is then converted to the 4-bromo-3-methoxyisothiazole by treatment with a halogenating agent by a process as in the preparation of the Type A compounds described above.

The 4-bromo-3-methoxyisothiazole is then reacted with an equimolar or excess amount of cuprous cyanide, in a polar, non-hydroxylic solvent such as dimethylformamide, to give the 4-cyano-3-methoxyisothiazole. The 4-carbamoyl-3-methoxyisothiazoles are prepared by the hydrolysis of 4-cyano-3-methoxyisothiazoles with sulfuric acid. When the carbamoyl derivative is hydrolyzed with nitrous acid, a 4-carboxy-3-methoxyisothiazole is obtained. In the demethylation reactions, an equimolar amount or an excess of sulfuric acid or nitrous acid is used, and the reactions can be carried out in a wide variety of solvents. The 5-halo and 5-alkyl-4-carboxyl and 4-carbamoyl-3-methoxyisothiazoles are prepared from the corresponding 4-cyano-3-methoxyisothiazole, which is in turn prepared from 3-methoxyisothiazole.

The 4-nitro-3-methoxyisothiazoles are prepared by a classical nitration of 3-methoxyisothiazole in a nitric acid-sulfuric acid mixture, generally using an equimolar amount of nitric acid and excess sulfuric acid.

The Type G compounds can be prepared by extension of the method of J. Goerdeler and U. Keuser, Chem. Ber., 97, 3106 (1964). This method involves the cyclization of a substituted α-cyanothiomalonamide with a halogenating agent in a non-hydroxylic solvent, such as benzene, toluene, ethyl acetate, ethylene dichloride, and the like. The α-cyanothiomalonamides are prepared by the reaction of cyanoacetamide with an alkylisothiocyanate in the presence of a strong base in a non-hydroxylic solvent. The reaction scheme may be represented by the following equations:

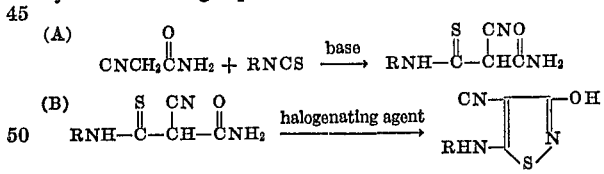

wherein R is an alkyl group of one to eight carbon atoms. Generally, an equimolar or an excess amount of the base and halogenating agent are used, and the reaction proceeds satisfactorily when carried out at about 0° to about 60° C.

Type H compounds are prepared by esterification of the respective 4-carboxy-3-hydroxyisothiazoles using excess alcohol as solvent and an acid catalyst, such as hydrogen chloride or p-toluene sulfonic acid.

A wide variety of methods can be employed to produce the 3-hydroxyisothiazole salts of the invention. The metal salts of Formula II can be prepared by adding a metal oxide to an aqueous solution of the isothiazole, or by adding a metal salt to an aqueous solution of the isothiazole which has been neutralized with a strong base, such as potassium hydroxide or sodium hydroxide. The metal 3-hydroxyisothiazole salt will generally precipitate out at once or after standing for a period, and this precipitate can be filtered off and washed with water. In preparing some metal salts of the 3-hydroxyisothiazoles, it may be advantageous to gently heat the solution at a temperature of up to 100° C. to hasten formation of the metal salt.

The salts of 3-hydroxyisothiazoles with strong inorganic acids of Formula IV can be prepared by bubbling an anhydrous acid, such as hydrogen bromide or hydrogen chloride through a solution of the isothiazole in an inert organic solvent, such as chloroform or ethyl ether. These salts can also be prepared by adding the 3-hydroxyisothiazole to a concentrated aqueous solution of the acid. In both of these processes, the salt will precipitate and can be conveniently filtered off. The salts of 3-hydroxyisothiazoles with strong organic acids can be prepared by adding the acid to a solution of the isothiazole in an inert organic solvent. If no precipitate forms immediately, the solution can then be cooled and crystallization of the salt induced. The salts of Formula III with organic bases can be prepared by adding an equivalent amount of the base to a solution of the isothiazole in an inert organic solvent. A precipitate may form immediately, or cooling of the solution or evaporating off the solvent may be necessary to cause the salt to crystallize.

By way of demonstration, the following examples are offered to illustrate this invention and are not to be construed as limitations thereof. In the examples, parts are by weight unless otherwise indicated. Examples 1 through 18 are tabulated in Table I, Examples 19 through 37 in Table Ia, and Examples 38 through 43 in Table Ib, which list their embodiments, elemental analyses and melting points. Specific preparations of Examples 1, 3, 4, 8, 9, 10, 11, 12, 17, 20, 37, and 41 are set out below to illustrate the various methods of preparing the 3-hydroxyisothiazoles of the invention.

EXAMPLE 1

Preparation of 4-bromo-3-hydroxyisothiazole

To a solution of 5.1 parts (0.05 mole) of 3-hydroxyisothiazole in 90 parts of ethyl acetate, there was added dropwise 8.0 parts (0.05 mole) of bromine. After stirring for 12 hours, the resulting slurry was filtered to yield 3.0 parts of 4-bromo-3-hydroxyisothiazole hydrobromide, M.P. 188° C. (dec.). Evaporation of the ethyl acetate filtrate left 3.7 parts of white solid 4-bromo-3-hydroxyisothiazole having a melting point of 193°–195° C.

EXAMPLE 3

Preparation of 5-chloro-3-hydroxyisothiazole

In a one-liter, 3-necked flash equipped with a mechanical stirrer, thermometer, and dropping funnel there were mixed 500 ml. of ethylene dichloride and 20.8 g. (0.1 mole) of dithiodipropionamide. This mixture was stirred at 10–15° C. and 42.5 g. (0.306 mole) of sulfuryl chloride was added dropwise over 2 hours. On completion of the addition, the reaction slurry was allowed to warm to 25–30° C. and stirred overnight to assure complete reaction. The reaction slurry was then filtered, and the precipitate was digested in 150 ml. of hot water. The aqueous solution was filtered to remove some insoluble material and then cooled in ice to yield after filtration and drying 4.0 g. of 5-chloro-3-hydroxyisothiazole as a tan crystalline solid, M.P. 95–96° C.

EXAMPLE 4

Preparation of 4-bromo-5-chloro-3-hydroxyisothiazole

To a solution of 100 ml. of ethyl acetate and 6.8 g. (0.05 mole) of 5-chloro-3-hydroxyisothiazole prepared in accordance with Example 3, there was added at 0° C. a solution of 8 g. (0.05 mole) of bromine in 25 ml. of ethyl acetate. After addition the red reaction solution was allowed to warm to room temperature, and after 1 hour, the solvent was removed under reduced pressure to leave 13.7 g. of dark orange solid. Treatment of this solid with water left, after drying, 8.7 g. of 4-bromo-5-chloro-3-hydroxyisothiazole, M.P. 145–147° C. from ethyl acetate.

EXAMPLE 8

Halogenation of 2-betathioketoamide

Thioacetoacetamide hydrochloride (126.7 parts, 0.826 mole) was slurried in 2250 parts of ethyl acetate and treated dropwise at 0° C. with 264 parts (1.652 moles) of bromine in an equal volume of ethyl acetate. After stirring for 12 hours at 25° C., the slurry was filtered to yield 60.2 parts of a product which was primarily a mixture of 4-bromo-5-methyl-3-hydroxyisothiazole and 5-methyl-3-hydroxyisothiazole hydrobromide having a melting point of 177°–180° C.

EXAMPLE 9

Preparation of 5-methylsulfinyl-4-cyano-3-hydroxyisothiazole

A solution of 4.1 parts (0.024 mole) of 5-methylthio-4-cyano-3-hydroxyisothiazole in 400 parts of acetone was treated at 25° C. with 40 parts of an acetone solution containing 8.2 parts (0.025 mole) of m-chloroperbenzoic acid. After stirring for 1.5 hours, the acetone was evaporated to leave a yellow solid residue which upon treatment with diethyl ether gave 1.2 parts of solid 5-methylsulfinyl-4-cyano-3-hydroxyisothiazole having a melting point of 180°–186° C. (dec.).

EXAMPLE 10

Preparation of 5-methylsulfonyl-4-cyano-3-hydroxyisothiazole

A solution of 4.1 parts (0.024 mole) of 5-methylsulfinyl-4-cyano-3-hydroxyisothiazole in 400 parts of acetone was treated at 25° C. with 40 parts of an acetone solution containing 16.4 parts (0.05 mole) of m-chloroperbenzoic acid. After stirring for 2 days, the acetone was evaporated to leave a yellow solid residue, which upon treatment with diethyl ether gave 2.0 parts of solid 5-methylsulfonyl-4-cyano-3-hydroxyisothiazole having a melting point of 231°–233° C. (dec.).

EXAMPLE 11

Preparation of 4-carboxy-3-hydroxyisothiazole

To a solution of 9.2 g. (0.08 mole) of 3-methoxyisothiazole in 20 ml. of glacial acetic acid was added dropwise at 25° C. a solution of 12.8 g. (0.08 mole) of bromine in 20 ml. of glacial acetic acid. After stirring overnight the slurry which had formed was poured into 400 g. of ice-water and allowed to stand. The precipitated solid was extracted into ether, and the aqueous phase was neutralized with solid sodium bicarbonate and extracted with ether again. The combined ether extract was dried over anhydrous magnesium sulfate and evaporated to leave an oil residue. This material was distilled to give 11.1 g. (72%) of 4-bromo-3-methoxyisothiazoie, B.P. 70° C. (5 mm.). which solidified on cooling in ice.

To a solution of 38.8 g. (0.2 mole) of 4-bromo-3-methoxyisothiazole in 80 ml. of dimethylformamide was added 54 g. (0.6 mole) of cuprous cyanide. The mixture was stirred and heated at reflux for 1 hour. Then the reaction mixture was cooled to 25° C., and 40 g. (0.81 mole) of sodium cyanide in 120 ml. of water was added in portions. The mixture exothermed to 60–70° C. and was allowed again to cool to 25° C. The reaction solution was then extracted thoroughly with ether. The ether extracts were washed with 10% sodium cyanide solution and then water. After drying over anhydrous magnesium sulfate and evaporation 23.4 g. (83%) of 4-cyano-3-methoxyisothiazole was obtained as a white solid, M.P. 60–62° C. after crystallization from ligroin (90–120°).

To 195 ml. of 80% sulfuric acid at 100° C. was added 12.5 g. (0.089 mole) of 4-cyano-3-methoxyisothiazole. The mixture was allowed to cool to room temperature over ½ hour. The temperature was then lowered to 10–

15° C. and a solution of 17.9 g. (0.26 mole) of sodium nitrite in 35 ml. of water was added slowly beneath the surface of the liquid. After addition the reaction was allowed to come to room temperature, then was heated to 60° C. for several minutes and allowed to cool. The solution was then poured into 450 ml. of ice water to precipitate solid 4-carboxy-3-methoxyisothiazole. After filtration, this latter crude product was added to 200 ml. of 48% hydrobromic acid and heated at 80° C. for 2 hours to form a solution. The reaction solution was then cooled in Dry-Ice to precipitate a solid product, which after filtration, washing with water, and drying gave 8.50 g. (60%) of pure 4 - carboxy-3-hydroxyisothiazole, M.P. 202-4 (dec.).

EXAMPLE 12

Preparation of 4-carbamoyl-3-hydroxyisothiazole

A solution of 2.8 g. (0.02 mole) of 4-cyano-3-methoxyisothiazole prepared as in Example 11 in 30 ml. of 75% sulfuric acid was heated at 70° C. for 0.5 hour. The solution was then cooled and poured onto ice to give after filtration and drying 0.95 g. of 4-carbamoyl-3-methoxyisothiazole, M.P. 165–168° C. By continuous ether extraction of the aqueous filtrate an addition 1.13 g. of 4-carbamoyl-3-methoxyisothiazole was obtained to give a total yield of 2.08 g. (66%). Following the procedure of Example 11, the 4-carbamoyl-3-methoxyisothiazole was hydrolyzed with 48% hydrobromic acid to give 4-carbamoyl-3-hydroxyisothiazole, M.P. 222 (dec.).

EXAMPLE 17

Preparation of 4-cyano-5-butylamino-3-hydroxyisothiazole

Potassium metal (3.90 g., 0.10 mole) was dissolved in 40 ml. of t-butanol and 20 ml. of tetrahydrofuran (THF). To this solution was then added 8.4 g. (0.10 mole) of cyanoacetamide in 10 ml. of THF to form a thick yellow slurry. After stirring for one hour, the mixture was cooled to 10° C. and 11.5 g. (0.10 mole) of n-butylisothiocyanate in 20 ml. of THF was added slowly. After stirring at room temperature for three hours, a solution had formed. The solvent was then evaporated under vacuum, and the residue was taken up in 400 ml. of water. The aqueous solution was then extracted with ether and acidified with 2 N hydrochloric acid. The solid which precipitated was collected and dried to give 8.4 g. (42%) α-(N-n-butylthiocarbamoyl)cyanoacetamide.

The product from above (4.0 g., 0.02 mole) was dissolved in 70 ml. of ethyl acetate and treated over 0.75 hour at 25° C. with 3.2 g. (0.02 mole) of bromine in 30 ml. of ethyl acetate. The yellow precipitate which formed was filtered off, washed with water, and dried to give 2.25 gm. (56%) of 4-cyano-5-butylamino-3-hydroxyisothiazole, M.P. 194–96° C.

EXAMPLE 20

Preparation of 3-hydroxyisothiazole zinc salt

To a solution of 20.2 g. (0.20 mole) of 3-hydroxyisothiazole in 100 ml. of water was added 8.14 g. (0.1 mole) of zinc oxide. The mixture was stirred at 50–60° C. for 1.5 hour, during which time the mixture turned to a fairly thick white paste. The solid was removed by filtration and dried to give 23.75 g. (90%) of 3-hydroxyisothiazole zinc salt, M.P. 300–305° C. (dec.).

EXAMPLE 37

Preparation of 3-hydroxyisothiazole morpholine salt

To a solution of 5.0 g. (0.05 mole) of 3-hydroxyisothiazole in 10 ml. of methanol was added 4.3 g. (0.05 mole) of morpholine with an exotherm to about 40° C. The solution was then cooled to 5° C. to precipitate a solid, which upon filtration and drying gave 6.5 g. (70%) of 3-hydroxyisothiazole morpholine salt, M.P. 79–82° C.

EXAMPLE 41

Preparation of 3-hydroxyisothiazole maleic acid salt

In 50 ml. of ethyl acetate was dissolved 10.1 g. (0.10 mole) of 3-hydroxyisothiazole and 5.8 g. (0.050 mole) of maleic acid by gently warming. Upon cooling the solid salt precipitated and was collected by filtration to give 7.6 g. (48%) of 3-hydroxyisothiazole maleic acid salt, M.P. 115–17° C.

TABLE I.—3-HYDROXYISOTHIAZOLE EXAMPLES $$Z \underset{S}{\overset{4\ \ 3}{\underset{5\ \ 2N}{\bigcirc}}} OH$$

| Example number | Z | Z' | M.P. | C | H | N | S | Halogen |
|---|---|---|---|---|---|---|---|---|
| 1 | Br | H | 193–195 | 20.20 (20.0) | 1.17 (1.1) | 7.73 (7.8) | 17.31 (17.7) | Br, 45.09 (44.4) |
| 2 | Cl | H | 165–170 | 27.61 (26.6) | 1.95 (1.5) | 9.73 (10.3) | 21.78 (23.6) | Cl, 26.15 (26.2) |
| 3 | H | Cl | 95–96 | 26.20 (26.5) | 1.22 (1.4) | 10.11 (10.3) | 23.29 (23.6) | Cl, 26.26 (26.20) |
| 4 | Br | Cl | 145–147 | 17.43 (16.8) | 0.61 (0.5) | 6.65 (6.5) | 15.17 (15.0) | {Cl, 16.67 (16.5) / Br, 33.81 (37.2)} |
| 5 | Cl | Cl | 151–154 | 21.61 (21.1) | 0.61 (0.6) | 7.86 (8.2) | 18.58 (18.8) | Cl, 40.35 (41.7) |
| 6 | CH₃ | H | 81–105 | 40.60 (41.7) | 4.39 (4.4) | 11.60 (12.2) | 25.6 (27.8) |  |
| 7 | CH₃ | Cl | 122 | 32.48 (32.2) | 3.45 (2.7) | 9.36 (9.4) | 19.20 (21.5) | Cl, 22.58 (23.8) |
| 8 [2] |  |  | 177–180 | 24.57 (24.7) | 2.76 (2.1) | 7.21 (7.2) | 16.21 (16.5) | Br, 41.12 _41.2) |
| 9 | CN | SOCH₃ | 180–186 | 31.77 (31.9) | 2.33 (2.1) | 14.36 (14.8) |  |  |
| 10 | CN | SO₂CH₃ | 231–233 | 29.76 (29.4) | 1.89 (1.9) | 13.22 (13.7) | 30.11 (31.3) |  |
| 11 | CO₂H | H | [3] 202–4 | 32.37 (33.1) | 2.29 (2.07) | 9.00 (9.66) | 20.63 (22.1) |  |
| 12 | CONH₂ | H | [3] 222 | 34.01 (33.3) | 2.63 (2.78) | 19.20 (19.4) | 22.30 (22.2) |  |
| 13 | NO₂ | H | 170 | 25.32 (24.7) | 1.52 (1.37) | 18.81 (19.2) | 21.67 (21.9) |  |
| 14 | CO₂H | SCH₃ | 240–41 | 31.56 (31.4) | 2.91 (2.63) | 7.43 (7.38) | 32.12 (33.7) |  |
| 15 | CONH₂ | SCH₃ | [3] 260.61 | 31.88 (31.6) | 3.72 (3.20) | 14.22 (14.7) | 33.16 (33.7) |  |
| 16 | H | C₆H₁₃-n | Oil | 54.41 (58.4) | 7.97 (8.11) | 7.82 (7.57) | 19.10 (17.3) |  |
| 17 | CN | NHC₄H₉-n | 194–6 | 48.70 (48.8) | 5.86 (5.86) | 21.04 (21.3) | 16.16 (16.3) |  |
| 18 | CN | NHC₂H₅ | 212–14 | 42.95 (42.6) | 4.26 (4.17) | 24.54 (24.8) | 18.68 (18.9) |  |

[1] The number parenthesized represents the theoretical value, as calculated, using the empirical formula of each compound.
[2] A mixture comprising 4-bromo-5-methyl-3-hydroxyisothiazole and 5-methyl-3-hydroxyisothiazole hydrobromide.
[3] Decomposed.

TABLE Ia.—SALTS OF 3-HYDROXYISOTHIAZOLES

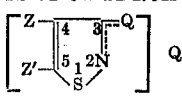

| Example number | Q | Z | Z' | Analysis [1] C | H | N | S | Metal | Miscellaneous |
|---|---|---|---|---|---|---|---|---|---|
| 19 | Na+ | H | H | 22.29 (24.9) | 2.56 (3.05) | 9.79 (9.69) | 21.84 (22.1) | 15.24 (15.9) | H₂O, 15.0 |
| 20 | Zn++ | H | H | 27.27 (27.1) | 1.90 (1.50) | 9.32 (10.6) | 21.20 (24.1) | 21.2 (24.6) | |
| 21 | CdCl+ | H | H | 15.14 (14.5) | 1.51 (0.81) | 5.46 (5.65) | 13.22 (12.9) | 42.45 (45.4) | Cl, 13.78 (14.3) |
| 22 | Fe++ | H | H | 28.50 (28.2) | 2.03 (1.6) | 10.81 (11.0) | 24.00 (25.0) | 9.48 (21.8) | |
| 23 | Cu++ | H | H | 28.89 (27.4) | 1.88 (1.52) | 10.87 (10.8) | 24.20 (24.3) | 16.03 (24.1) | |
| 24 | Co++ | H | H | 29.10 (27.8) | 2.29 (1.50) | 11.10 (10.7) | 21.56 (24.8) | 13.50 (22.7) | |
| 25 | Ni++ | H | H | 28.60 (27.8) | 2.33 (1.50) | 10.83 (10.7) | 24.40 (24.8) | 12.16 (22.7) | |
| 26 | Fe+++ | H | H | 25.92 (30.4) | 2.06 (1.69) | 9.41 (11.8) | 19.00 (27.0) | 14.55 (15.7) | |
| 27 | Hg++ | H | H | 15.43 (18.0) | 1.48 (1.10) | 5.69 (7.0) | 12.85 (16.0) | 58.7 (50.0) | |
| 28 | HgOAc+ | H | H | 16.66 (16.7) | 1.51 (1.39) | 3.92 (3.88) | 9.05 (8.91) | 56.03 (55.8) | |
| 29 | Zn++ | H | Cl | 20.63 (21.6) | 0.85 (0.60) | 7.78 (8.40) | 18.02 (19.2) | 20.32 (19.6) | Cl, 20.93 (21.2) |
| 30 | Zn++ | Cl | Cl | 17.60 (17.9) | | 6.50 (69) | 15.17 (15.9) | | Cl, 32.08 (35.2) |
| 31 | HgCl+ | H | H | 10.85 (10.7) | 0.84 (0.6) | 3.95 (4.16) | 9.39 (9.53) | 57.19 (59.7) | |
| 32 | HgOH+ | H | H | 11.16 (11.3) | 0.79 (0.95) | 4.07 (4.43) | 10.40 (10.1) | 65.94 (63.1) | |
| 33 | ⟨C₆H₅⟩—CH₂N+(CH₃)₂C₁₂₋₁₈H₂₅₋₃₃ | H | H | | | | | | |
| 34 | t-C₈H₁₇+NH=CH—NHC₈H₁₇-t | H | H | 62.18 (64.9) | 10.53 (10.6) | 11.13 (11.4) | 8.16 (8.7) | | |
| 35 | n-C₁₀H₂₁+NH=CH—NHC₁₀H₂₁-n | H | H | 63.25 (67.8) | 10.46 (11.1) | 9.30 (9.9) | 7.10 (7.5) | | |
| 36 | C₆H₅CH₂+NH₃ | H | H | 56.43 (57.7) | 5.95 (5.8) | 12.78 (13.4) | 15.13 (15.4) | | |
| 37 | ⟨O—N+—H₂⟩ | H | H | 40.75 (44.7) | 5.23 (6.4) | 13.76 (14.9) | | | |

[1] See footnote 1, Table I.

TABLE Ib.—SALTS OF 3-HYDROXYISOTHIAZOLES

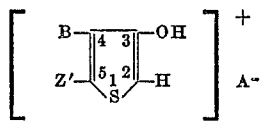

| Example number | A | Z | Z' | Analysis [1] C | H | N | S | Halogen |
|---|---|---|---|---|---|---|---|---|
| 38 | Cl⁻ | H | H | 25.30 (26.2) | 2.68 (2.90) | 9.85 (10.2) | 22.59 (23.3) | Cl, 24.15 (25.8) |
| 39 | NO₃⁻ | H | H | 21.92 (22.1) | 2.03 (1.84) | 16.18 (17.1) | 19.21 (19.6) | |
| 40 | HSO₄⁻ | H | H | 22.62 (20.0) | 2.45 (1.67) | 8.49 (7.74) | 29.45 (35.4) | |
| 41 | ⁻O₂C—CH=CH—CO₂⁻ | H | H | 37.85 (37.7) | 3.69 (3.14) | 8.85 (8.80) | 20.07 (20.1) | |
| 42 | ⁻O₂C—CO₂⁻ | H | H | 32.84 (32.9) | 2.87 (2.74) | 9.59 (9.59) | 22.03 (21.92) | |
| 43 | Br⁻ | Br | H | 13.67 (13.8) | 2.08 (1.2) | 5.56 (5.37) | 12.36 (12.3) | Br, 61.11 (61.2) |

[1] See footnote 1, Table I.

The novel hydroxyisothiazoles of this invention are biocidally active compounds, and as such, are suitable for the control of living organisms, and particularly microorganisms. For this reason, they are especially effective bactericidal, algaecidal, fungicidal, slimicidal, and pesticidal agents. Furthermore, these novel compounds possess the unexpected property of being resistant to inhibition by common additives or contaminants such as lecithin, normal hose serum, alkylbenzene sulfonates, water-soluble lanolin, sodium chromate, sodium nitrite, glycerol, propylene glycol and the like.

In addition to the novel substituted 3-hydroxyisothiazoles disclosed herein, it was also determined that several known hydroxyisothiazoles likewise exhibit biocidal activity. These compounds which were known in the literature but did not have any biocidal activity attributed to them prior to present disclosure include the following:

3-hydroxyisothiazole,
5-methyl-3-hydroxyisothiazole,
4-bromo-5-methyl-3-hydroxyisothiazole,
4-cyano-5-methylthio-3-hydroxyisothiazole,
5-phenyl-3-hydroxyisothiazole,
4-carbamoyl-5-anilino-3-hydroxyisothiazole, and
4-cyano-5-anilino-3-hydroxyisothiazole.

Antibacterial activity was evaluated by the Serial Dilution Test (Broth Titer Test) wherein a series of broths containing varying dilutions of a test compound and an organism are halved starting with 1:1,000. The values obtained which are shown in Table II and Table IIa represent the maximum dilution at which the compound under evaluation renders complete control of the organism. Staphylococcus aureus (S. aureus) and Escherichia coli (E. coli) were the bacterial organisms employed in this test.

Fungicidal evaluation of the isothiazoles was carried out by the standard slide spore germination test (cf. Phytopathology, 33, 627 (1943), utilizing spores of Alternaria solani (Alt.), Sclerotinia fructicola (Scl.) and Stemphylium sarcinaeforme (Stem.) or Botrytis cinerea (Bot.), or by the Serial Dilution Test, employing Aspergillus niger (A. niger) and Rhizopus stolonifer (Rhiz.) as test organisms. The values in Table II for the results of the slide spore germination test are given in parts per million which effectively controlled 50% of the spores. The values in Table IIa represent the maximum dilution at which the compound under evaluation completely controls the organism.

The 3-hydroxyisothiazoles of the invention are also effective as algaecides. The algaecidal activity of the 3-hydroxyisothiazoles was determined by the Fitzgerald Test (Applied Microbiology, 7, 205–211, No. 4, 1959). Table III shows the parts per million of the 3-hydroxyisothiazole under evaluation necessary for complete control of the organism. Chlorella pyrenoidosa (Chlorella) and "Black" algae (Oscilatoria sp.) were the algae employed in this test.

TABLE II.—MICROBIOLOGICAL ACTIVITY

|  | Fungicidal evaluation | | | Bacteriostatic evaluation | |
| --- | --- | --- | --- | --- | --- |
|  | Alt. | Scl. | Stem. (Bot.*) | S. aureus | E. coli |
| Example number: |  |  |  |  |  |
| 1 | 200–1,000 | 50–200 | 200–1,000 | 1:8,000 | 1:4,000 |
| 2 |  |  |  | 1:8,000 | 1:8,000 |
| 3 | <1 | 1–10 | *1–10 | 1:64,000 | 1:128,000 |
| 4 |  |  |  | 1:32,000 | 1:32,000 |
| 5 |  |  |  | 1:32,000 | 1:32,000 |
| 6 |  |  |  | 1:2,000 | 1:8,000 |
| 7 |  |  |  | 1:2,000 | 1:32,000 |
| 8 | 10–50 | 50–200 | 10–50 | <1:1,000 | <1:1,000 |
| 9 | 50–200 | 50–200 | 200–1,000 | 1:1,000 | 1:1,000 |
| 10 | 50–200 | 200–1,000 | 50–200 | <1:1,000 | 1:1,000 |
| 3-hydroxyisothiazole |  |  |  | 1:16,000 | 1:32,000 |
| 5-methyl-3-hydroxyisothiazole | 10–50 | 10–50 | 200–1,000 | <1:1,000 | 1:1,000 |
| 4-bromo-5-methyl-3-hydroxyisothiazole | 50–200 | 200–1,000 | 1–10 | 1:1,000 | 1:1,000 |
| 4-cyano-5-methylthio-3-hydroxyisothiazole | 50–200 | 50–200 | 50–200 | 1:2,000 | <1:1,000 |

TABLE IIa.—MICROBIOLOGICAL ACTIVITY

|  | Fungistatic evaluation | | Bacteriostatic evaluation | |
| --- | --- | --- | --- | --- |
|  | A. niger | Rhiz. | S. aureus | E. coli |
| Example number: |  |  |  |  |
| 11 | 1:2,000 | <1:2,000 | 1:1,000 | 1:1,000 |
| 12 | <1:2,000 | <1:2,000 | 1:1,000 | 1:1,000 |
| 13 | 1:2,000 | 1:2,000 | 1:8,000 | 1:4,000 |
| 14 | <1:2,000 | <1:2,000 | 1:1,000 | <1:1,000 |
| 15 | <1:2,000 | <1:2,000 | 1:1,000 | <1:1,000 |
| 16 | 1:16,000 | 1:32,000 | 1:8,000 | 1:1,000 |
| 17 | <1:2,000 | <1:2,000 | 1:2,000 | 1:1,000 |
| 18 | <1:2,000 | <1:2,000 | 1:1,000 | 1:1,000 |
| 19 | 1:4,000 | 1:16,000 | 1:16,000 | 1:32,000 |
| 20 | 1:16,000 | 1:32,000 | 1:8,000 | 1:16,000 |
| 21 |  |  | 1:125,000 | 1:125,000 |
| 22 | 1:32,000 | 1:32,000 | 1:16,000 | 1:16,000 |
| 23 | 1:32,000 | 1:32,000 | 1:32,000 | 1:32,000 |
| 24 | 1:32,000 | 1:32,000 | 1:16,000 | 1:32,000 |
| 25 | 1:32,000 | 1:32,000 | 1:22,000 | 1:32,000 |
| 26 | 1:8,000 | 1:16,000 | 1:16,000 | 1:16,000 |
| 27 | 1:8,000 | 1:16,000 | 1:128,000 | 1:32,000 |
| 28 |  |  | 1:64,000 | 1:32,000 |
| 29 | 1:8,000 | 1:250,000 | 1:32,000 | 1:64,000 |
| 31 | 1:4,000 | 1:16,000 | 1:128,000 | 1:32,000 |
| 32 | 1:4,000 | 1:16,000 | 1:128,000 | 1:64,000 |
| 33 | 1:32,000 | 1:64,000 | 1:1,000,000 | 1:64,000 |
| 34 | 1:8,000 | 1:16,000 | 1:8,000 | 1:8,000 |
| 35 | 1:8,000 | 1:8,000 | 1:256,000 | 1:1,000 |
| 36 | 1:2,000 | 1:4,000 | 1:2,000 | 1:2,000 |
| 37 | 1:8,000 | 1:8,000 | 1:4,000 | 1:4,000 |
| 38 | 1:8,000 | 1:16,000 | 1:16,000 | 1:16,000 |
| 39 | 1:4,000 | 1:16,000 | 1:8,000 | 1:32,000 |
| 40 | 1:8,000 | 1:16,000 | 1:8,000 | 1:16,000 |
| 41 | 1:16,000 | 1:32,000 | 1:8,000 | 1:16,000 |
| 42 | 1:8,000 | 1:32,000 | 1:8,000 | 1:16,000 |
| 5-phenyl-3-hydroxyisothizaole | 1:4,000 | 1:8,000 | 1:1,000 | 1:1,000 |
| 4-carbamoyl-5-anilino-3-hydroxyisothiazole | 1:2,000 | 1:2,000 | 1:1,000 | 1:1,000 |
| 4-cyano-5-anilino-3-hydroxyisothiazole | 1:2,000 | 1:2,000 | 1:2,000 | 1:1,000 |

TABLE III.—ALGAESTATIC EVALUATION

|  | Minimal algaestatic conc. (p.p.m.) | |
| --- | --- | --- |
|  | Chlorella | Black algae |
| Example number: |  |  |
| 1 | 5 | 5 |
| 2 | 10 | 10 |
| 3 | <0.5 | 1 |
| 4 | 1 | 2 |
| 5 | 5 | 2 |
| 6 | 5 | <20 |
| 7 | 20 | 20 |
| 13 | >10 | 1 |
| 19 | 10 | >20 |
| 20 | 2 | 10 |
| 21 | 2 | 0.5 |
| 22 | 2 | 0.5 |
| 23 | 2 | 0.5 |
| 24 | 2 | 1 |
| 25 | 2 | 1 |
| 26 | 2 | 1 |
| 27 | 1 | 0.5 |
| 29 | 5 | 10 |
| 33 | 1 | 2 |
| 34 | 5 | 5 |
| 35 | 2 | 2 |
| 37 | 10 | 10 |
| 38 | 5 | >10 |
| 39 | 10 | 5 |
| 40 | 2 | >10 |
| 41 | 2 | 2 |
| 42 | 2 | 1 |
| 3-hydroxyisothiazole | 1.25 | 5 |
| 5-phenyl-3-hydroxyisothiazole |  | 10 |

Further fungicidal activity on the part of the hydroxyisothiazoles was demonstrated by their utilization in seed treatment applications. By seed treatment is meant the disseminating of a biocidally active material over a seed subject to the attack of microorganisms, and particularly fungi, in an amount which is effective to control such microorganisms without deleteriously effecting such seed. In most circumstances, the biocidally active material, in this case, the hydroxyisothiazoles or compositions thereof will be applied to the surface area of the seeds to be treated. This may be accomplished by varying means common to the art, such as slurrying, soaking, dusting, spraying and the like.

The amount of hydroxyisothiazole required so as to be effective in a seed treatment application will vary depending upon conditions, such as the type of seed, the method of application, soil and atmospheric conditions, and the like. Generally, an application in the range of about 0.25 to 20 ounces of active ingredient, namely, the hydroxyisothiazole per 100 pounds of seed will be effective to control any undesirable microorganisms and so provide protection to the seed. An application of active agent in the range of about 1.0 to 10 ounces per 100 pounds of seed is preferred.

An experimental technique was employed to demonstrate the effectiveness of these compounds for seed treatment. This involved slurrying two lots of 100 corn seeds each with the hydroxyisothiazole under evaluation at a level of 1 to 2 ounces per bushel of seed. For purposes of comparison, an untreated control was also included. After drying, the seeds were planted in a muck soil infested with Pythium and having a high moisture content. The corn seeds were maintained in this soil for a week at about 10° C. so as to permit infection. Upon completion of this period of time, the temperature was elevated and maintained at about 21° to 27° C. so as to permit germination of the non-infected seed. The number of seeds germinating were counted after emergence of the plant and such data is set forth in Table III.

TABLE IV

Seed treatment

| Test compound: | No. of plants germinating/200 seeds |
|---|---|
| (Untreated) | 10 |
| 5-chloro-3-hydroxyisothiazole | 122 |
| 4-bromo-5-chloro-3-hydroxyisothiazole | 104 |
| 4,5-dichloro-3-hydroxyisothiazole | 131 |
| 4-methyl-5-chloro-3-hydroxyisothiazole | 94 |
| 3-hydroxyisothiazole | 150 |
| 3-hydroxyisothiazole zinc salt | 175 |
| 5-chloro-3-hydroxyisothiazole zinc salt | 132 |

Evaluation of the hydroxyisothiazoles with regard to pesticidal activity demonstrated their exceptional control of numerous nematodes, mites, insects, such as beetles and aphids, and the like. Some typical nematodes, insects and mites which were controlled when contacted with the compounds of this invention included the following: Northern root knot nematode (*Meloidogyne hapla*), Mexican bean beetle (*Epilachna varivesta*), black carpet beetle (*Attagenus piceus*), confused flour beetle (*Tribolium confusum*), granary weevil (*Sitophilus granarius*), two spotted mite (*Tetranychus urticae*), house fly (*Musca domestica*), Southern armyworm (*Prodenia oridania*), German cockroach (*Blattella germania*), and green peach aphid (*Myzus persicae*).

Generally, control of a living organism is achieved in accordance with this invention by contacting the organism with a hydroxyisothiazole in an amount which is effective to control said organism. Any of the techniques known in the art may be employed to disseminate the hydroxyisothiazoles in a manner so as to achieve the desired contact with the organism to be controlled. Spraying and fumigating are typical of such techniques.

The compounds of this invention can be readily utilized as slimicides, algaecides, bactericides, and fungicides in any locus and particularly in aqueous media, such as, for example, water-cooling systems, swimming pools, paper pulp processes, aqueous polymer dispersions, water-based paints, and the like. In addition, these compounds and compositions containing them can function as, for example, fabric and leather preservatives, cosmetic preservatives, soap additives, sanitizing agents, such as in laundry soaps and detergents, and preservatives for metal working compounds, such as emulsifiable cutting oils, preservatives for fuels, fiber spin finish biocides, and the like.

In general, a locus subject to contamination by microorganisms can be protected in accordance with this invention by incorporating into the locus a hydroxyisothiazole or a salt of a hydroxyisothiazole in an amount which is effective to control the microorganisms. The term "contamination" is meant to include any attack by microorganisms which leads to a chemical or physical breakdown or disintegration of the locus as well as the proliferation of the microorganisms within the locus without an accompanying deleterious effect. The exact amount of hydroxyisothiazole required will, of course, vary with the medium being protected, the microorganisms being controlled, the particular hydroxyisothiazoles or compositions containing the hydroxyisothiazoles being employed and the like. Typically, in a liquid medium, excellent control is obtained when the hydroxyisothiazoles are incorporated in the range of 0.1 to 10,000 parts per million (p.p.m.) or 0.00001 to 1% based on the weight of the media. A range of 1 to 2000 p.p.m. is preferred.

The term "control," as employed in the specification and claims of this application, is to be construed as the effect of any means which adversely affects the existence or growth of any living organism or microorganism. This effect may comprise a complete killing action, eradication, arresting in growth, inhibition, reduction in number, or any combination thereof.

Outstanding fungistatic activity by the isothiazoles was exhibited when they were employed as paint preservatives and paint fungistats. Microbial activity in water-based and oil-based paint emulsions is effectively inhibited when these compounds are incorporated into the paint. The isothiazoles are also highly active mildewcides for paint films when incorporated in paint formulations.

The hydroxyisothiazoles of this invention are especially useful as agricultural fungicides. As such, they are particularly valuable when formulated in a fungicidal composition. Such compositions normally comprise an agronomically acceptable carrier and the compounds disclosed herein as the active agent or agents. Where necessary or desirable, surfactants or other additives may be incorporated to give uniformly formulated mixtures. By "agronomically acceptable carrier" is meant any substance which can be utilized to dissolve, dispense or diffuse the chemical incorporated therein without impairing the effectiveness of the toxic agent and which does no permanent damage to such environment as soil, equipment and agronomic crops.

For use as pesticides, the compounds of this invention are usually taken up in an agronomically acceptable carrier or formulated so as to render them suitable for subsequent dissemination. For example, the hydroxyisothiazoles may be formulated as wettable powders, emulsion concentrates, dusts, granular formulations, aerosols or flowable emulsifiable concentrates. In such formulations, the hydroxyisothiazoles are extended with a liquid or solid carrier and, when desired, suitable surfactants are likewise incorporated.

Compounds of this invention may be dissolved in a water-miscible liquid such as ethanol, isopropanol, acetone, and the like. Such solutions are easily extended with water.

The isothiazoles may be taken up on or mixed with a finely-particled solid carrier, for example, clays, inorganic silicates, carbonates, and silicas. Organic carriers may also be employed. Dust concentrates are commonly made wherein hydroxyisothiazoles are present in the range of 20 to 80%. For ultimate applications these concentrates are normally extended with additional solid from about 1 to 20%.

Wettable powder formulations are made by incorporating the compounds of this invention in an inert, finely divided solid carrier along with a surfactant which may be one or more emulsifying, wetting, dispersing or spreading agents or blend of these. The hydroxyisothiazoles are usually present in the range of 10 to 80% by weight and the surfactants in from 0.5 to 10% by weight. Commonly used emulsifying and wetting agents include polyoxyethylated derivatives of alkylphenols, fatty alcohols, fatty acids and alkylamines; alkylarene sulfonates and dialky sulfosuccinates. Spreading agents include such materials as glycerol mannitan laurate and a condensate of polyglycerol and oleic acid modified with phthalic anhydride. Dispersing agents include such materials as the sodium salt of the copolymer of maleic anhydride and an olefin such as diisobutylene, sodium lignin sulfonate and sodium formaldehydenaphthalene sulfonates.

One convenient method for preparing a solid formulation is to impregnate the isothiazole toxicant onto the solid carrier by means of a volatile solvent, such as acetone. In this manner, adjuvants, such as activators, adhesives, plant nutrients, synergists and various surfactants, may also be incorporated.

Emulsifiable concentrate formulations may be prepared by dissolving the isothiazoles of this invention in an agronomically acceptable organic solvent and adding a solvent-soluble emulsifying agent. Suitable solvents are usually water-immiscible and may be found in the hydrocarbon, chlorinated hydrocarbon, ketone, ester, alcohol and amide classes of organic solvents. Mixtures of solvents are commonly employed. The surfactants useful as emulsifying agents may constitute about 0.5 to 10% by weight of the emulsifiable concentrate and may be anionic, cationic or nonionic in character. Anionic surfactants include fatty alcohol sulfates or sulfonates, alkylarene sulfonates and sulfosuccinates. Cationic surfactants include fatty acid alkyl amine salts and fatty acid alkyl quaternaries. Non-ionic emulsifying agents include alkylene oxide adducts of alkylphenols, fatty alcohols, mercaptans and fatty acids. The concentration of the active ingredients may vary from 10 to 80%, preferably in the range of 25 to 50%.

For use as phytopathogenic agents, these compounds should be applied in an effective amount sufficient to exert the desired biocidal activity by techniques well known in the art. Usually, this will involve the application of the hydroxyisothiazoles to the locus to be protected in an effective amount when incorporated in an agronomically acceptable carrier. However, in certain situations it may be desirable and advantageous to apply the compounds directly onto the locus to be protected without the benefit of any substantial amount of carrier. This is a particularly effective method when the physical nature of the hydroxyisothiazoles is such as to permit what is known as "low-volume" application, that is, when the compounds are in liquid form or substantially soluble in higher boiling solvents.

The application rate will, of course, vary depending upon the purpose for such application, the hydroxyisothiazoles being utilized, the frequency of dissemination and the like.

For use as agricultural bactericides and fungicides, dilute sprays may be applied at concentrations of 0.05 to 20 pounds of the active hydroxyisothiazole ingredient per 100 gallons of spray. They are usually applied at 0.1 to 10 pounds per 100 gallons and preferably at 0.125 to 5 pounds per 100 gallons. In more concentrated sprays, the active ingredient is increased by a factor of 2 to 12. With dilute sprays, applications are usually made to the plants until run-off is achieved, whereas with more concentrated or low-volume sprays the materials are applied as mists.

The compounds of this inventon may be utilized as the sole biocidal agents or they may be employed in conjunction with other fungicides, insecticides, miticides and comparable pesticides.

The following Examples A through D illustrate several specific embodiments of the many uses of the isothiazoles of the invention.

EXAMPLE A

Preservatives for cutting oils

Both natural and synthetic cutting oils, that is, oils which are mixed with water and used as coolants and lubricants in, for example, lathe and other metal-working operations, are extremely susceptible to microbial attack when formulated for use. This microbial attack leads to the production of odor and to the eventual breakdown of the oil formulation. The isothiazoles of the invention are extremely useful in controlling microbial build-up, thus preventing this deleterious microbial attack, when incorporated in an emulsion or other diluted use formulation, either before or after the emulsification, at a level of about 10 to 10,000 parts per million of the use formulation. The preferred range of incorporation in the final emulsion is about 20 to about 2000 parts per million.

In order to evaluate the isothiazoles as preservatives, samples of contaminated cutting oil from actual use operations were obtained. These contaminated samples were used to inoculate uncontaminated cutting oil formulations to which an isothiazole had been added. After one month, the formulation was examined to determine whether the isothiazole was effective in controlling microbial attack, and, if so, the formulation was recontaminated. This examination and recontamination procedure was followed for a period of six months.

Two types of cutting oils were employed in testing the isothiazoles. In the first formulation, the isothiazole was added to a 1:60 oil-water emulsion of an emulsifiable cutting oil containing petroleum oil and special emulsifiers (commercially available as Gulf's Gulfcut Soluble Oil). The inoculum for the first formulation was a naturally contaminated oil emulsion. It was found that a concentration of about 100 to 250 parts per million of 3-hydroxyisothiazole was effective in controlling microbial attack in the cutting oil formulation for six months. Furthermore, 5-chloro-3-hydroxyisothiazole was effective in controlling microbial attack for one month (no examinations were made after one month) at a concentration of 50 p.p.m.

In the second formulation, the isothiazole was added to a 1:40 oil-water dilution of a synthetic cutting oil made up of triethanolamine, sulfonated red oils, sodium nitrite, an anionic free acid of a complex organic phosphate ester, and water (commercially available as H. Miller's Hamikleer No. 1591 Soluble Oil). The inoculum for the second formulation was a naturally contaminated soluble oil emulsion to which was added *Pseudomonas oleoverans* one of the most troublesome contaminants of cutting fluid emulsions. It was found that a concentration of 250 to 500 parts per million of 3-hydroxyisothiazole was effective in controlling microbial attack in the synthetic cutting oil formulation. By way of comparison, it was determined that 500 p.p.m. of ethylhexyldimethylalkylammonium cyclohexylsulfamate, a commercial cutting oil preservative, was ineffective in controlling bacterial attack in the Hamikleer cutting oil formulation.

The above tests indicate the usefulness of the isothiazoles of the invention as preservatives for cutting oil formulations.

EXAMPLE B

Control of algae, bacteria, fungi, and slime in cooling towers

A constantly recurring problem in water-cooling systems is the out-of-control growth of algae, bacteria, and fungi, and the associated formation of slime. The isothiazoles of the invention are quite effective in controlling algae, bacteria, and fungi, and slime formation in water-cooling systems, and especially in water-cooling towers. When used as a cooling tower microbicide, the isothiazole will generally be added at a concentration of about ½ to 1000 parts per million. The preferred concentration range of the isothiazole is about 1 to 250 parts per million.

The following test was employed to evaluate the isothiazoles as cooling tower microbicides.

A series of laboratory cooling towers, operated concurrently, was used for the evaluation study. The cooling tower liquid was an inorganic salts medium, designed to promote algal development. Approximately 8 liters of this liquid were held in the reservoir, at 35° C., and continuously recirculated over pine wood slats at a rate of 2.3 liters per minute. A similar, but more dilute medium was pumped continuously into each cooling tower reservoir at a rate of 150 ml./hr. This was sufficient to replenish the volume lost in evaporation and to provide the system with a bleed-off of approximately 8 liters in 3 days. A constant volume was maintained in the reservoir by use of an over-flow drain.

The cooling towers were heavily inoculated at the beginning of the study and twice per week thereafter with microorganisms (algae, bacteria, and fungi) obtained from a large commercial cooling tower. If necessary, the first two weeks of operation were used to establish an adequate population of microorganisms on the surfaces and in the reservoir, and, in addition, to determine volume losses due to evaporation. When starting with a fouled tower, treatment was initiated by the addition of the isothiazole at double the intended dose. When starting with a clean tower, treatment was initiated by the addition of the isothiazole at the maintenance dose. The isothiazole was then added periodically, usually once a week, to the diluting systems to restore the concentration levels to the intended maintenance dose. Four factors were considered in evaluating the effectiveness of the isothiazoles as cooling-tower microbicides—control of algae and control of non-algal slime as reflected in the appearance of the tower, and general control of bacteria and fungi in the water itself. Three isothiazoles were tested by the above procedure and found to be effective at the indicated minimum concentration in parts per million. These isothiazoles were 3-hydroxyisothiazole, at 15 p.p.m., 5-chloro-3-hydroxyisothiazole, at 15 p.p.m., and the zinc salt of 3-hydroxyisothiazole, at 15 p.p.m.

The above tests demonstrate the usefulness of the isothiazoles of the invention as water-cooling system microbicides.

EXAMPLE C

Paint film mildewcides

Paint films from water-based and oil-based paints are quite susceptible to mildewing, especially when applied on exterior surfaces. Presently, various mercury compounds are generally used as paint mildewcides. However, these mercury compounds have several disadvantages, including their susceptibility to sulfide staining and their toxicity. The isothiazoles of the invention are quite effective as paint mildewcides without the disadvantages of the mercurial mildewcides, and often with better performance than the mercury compounds. The concentration of isothiazole which is added to the paint can vary over a wide range depending on such factors as the type of paint involved, the locality of application, and the type of surface on which the paint is applied. Generally, about 1/10 lb. to 20 lb. of isothiazole per 100 gallons of paint will be effective. The preferred range of incorporation is about 1/2 lb. to 12 lb. of isothiazole per 100 gallons of paint.

In order to evaluate isothiazoles as paint mildewcides, wood sticks were painted with water-based paint formulations to which the isothiazole being tested had been added. The paint films were allowed to dry for two days, were treated with a test fungus (*Aspergillus niger* or *Aspergillus oryzae*) and after 7 to 10 days were examined for evidence of mildew formation. The following isothiazoles were tested as paint film mildewcides by the above procedure and found to be effective in inhibiting the growth of fungus at the concentrations indicated (in pounds of isothiazole per 100 gallons of paint): 3-hydroxyisothiazole, at 4 lb./100 gal., 5-chloro-3-hydroxyisothiazole, at less than 2 lb./100 gal., and the zinc salt of 3-hydroxyisothiazole, at 4 lb./100 gal.

The above tests and data demonstrate the useful qualities of the isothiazoles when used as paint film mildewcides.

EXAMPLE D

Preservatives for vinyl or acrylic emulsion polymer dispersions

On storage, aqueous dispersions of vinyl or acrylic emulsion polymers, such as those used in making water-based paints, may be subject to a buildup of microorganisms which may lead to the production of odor or discoloration in the dispersion or to actual physical or chemical breakdown of the polymer.

Examples of such polymer dispersions include polyvinyl acetate; polyisobutylene; polystyrene; polymers of dienes, such as of isoprene, chloroprene, butadiene, including copolymers of butadiene with styrene, acrylonitrile or mixtures thereof; copolymers of (a) a soft acrylate, such as a ($C_1$–$C_8$) alkyl acrylate (especially methyl acrylate, ethyl acrylate, butyl acrylate, 2-ethylhexyl acrylate or mixtures thereof), with (b) at least one hard comonomer, such as methyl methacrylate, acrylonitrile, styrene, vinyltoluene, vinyl acetate, and vinyl chloride, and (c) about 0.5 to 8% by weight of an $\alpha,\beta$-monoethylenically unsaturated acid, such as acrylic, methacrylic, crotonic, or itaconic acid such as those described in Conn et al. U.S. Pat. 2,795,564, June 11, 1957; and blends of any of these polymer dispersions with each other or with similar polymers containing a polar group, such as any of the blends mentioned in Scott U.S. Pat. 3,356,627, Dec. 5, 1967.

The isothiazoles of the invention are effective in controlling build-up of microorganisms in such aqueous polymer dispersions and in water-base paints made from them, thus, preventing deleterious contamination of the dispersion or paint. An advantage of using the isothiazoles as preservatives is that in proper concentration they will also function as mildewcides after the polymer dispersion or paint has been used to make a coating or film. When employed as preservatives, the isothiazoles are usually incorporated in the polymer dispersion in a concentration range of about 1/2 to 10,000 parts per million. The preferred concentration range is about 1 to 2000 parts per million.

In order to evaluate the isothiazoles as preservatives for polymer dispersions, various samples of different types of emulsion polymer dispersions, to which an isothiazole had been added, were contaminated with an inoculum consisting of naturally contaminated dispersion of the same type or with a culture of organisms isolated from naturally contaminated dispersions of the same type. For a period of six months, the samples were examined monthly for microbial contamination and then reinoculated with fresh inoculum.

The isothiazoles were evaluated as preservatives in several different types of commercially available acrylic polymer dispersions, of the type described in the Conn et al. and Scott U.S. patents mentioned above. Among the isothiazoles which were tested in one or more of such acrylic polymer dispersions and found to give control of microbial activity at a concentration of less than 1000 p.p.m. in the dispersion are 3-hydroxyisothiazole, 5-chloro-3-hydroxyisothiazole, and the zinc salt of 3-hydroxyisothiazole.

In addition to the above examples, the isothiazoles were found to be useful as laundry sanitizing agents. A wide concentration range can be employed in formulating detergents or soaps with the isothiazoles of the invention as sanitizing agents. Generally, about 0.01 to 10% of the isothiazole will be added to the soap or detergent, and the preferred range is about 0.05 to 5%. The isothiazole can also be added directly to the wash water, generally at a concentration of about 1/2 to 1000 parts per million.

Several isothiazoles were tested by the AATCC Methods 90–1965 T and 100–1965 T, referred to above, and found to give a bacteriostatic or a self-sanitizing residual on fabric aganist *S. aureus* and/or *E. coli* 100 p.p.m. or less. Among these isothiazoles are 3-hydroxyisothiazole, 5-chloro-3-hydroxyisothiazole, and the zinc salt of 3-hydroxyisothiazole.

The isothiazoles were also found to be quite useful as microbicides in fiber spin finish formulation, such as nylon spin finish formulations. In evaluating the isothiazoles in this application, samples of naturally contaminated spin finish formulations were obtained and used to inoculate uncontaminated formulations to which an isothiazole had been added. After a one month incubation, the test formulations were examined for contamination, and then recontaminated. In one such test, 3-hydroxyisothiazole was found to be very effective in controlling microbial contamination in fiber spin finish formulations at a concentration of 250 parts per million or less.

It is to be understood that changes and variations may be made without departing from the spirit and scope of the invention as defined by the appended claims.

We claim:

1. A compound of the formula

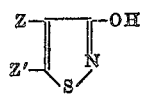

wherein

Z is hydrogen, $(C_1-C_4)$ alkyl, carboxy, $(C_1-C_4)$-carbalkoxy, carbamoyl, nitro, halogen, or cyano;

Z', when Z is cyano, carboxy, $(C_1-C_4)$carbalkoxy, or carbamoyl, is hydrogen, $(C_1-C_4)$alkyl, aralkyl of up to 8 carbon atoms, halogen, $(C_1-C_4)$alkylsulfinyl, aralkylsulfinyl of up to 8 carbon atoms, $(C_1-C_4)$alkylsulfonyl, aralkylsulfonyl of up to 8 carbon atoms, alkylamino of up to 8 carbon atoms, or aralkylamino of up to 8 carbon atoms;

Z', when Z is nitro, is hydrogen, $(C_1-C_4)$alkyl, aralkyl of up to 8 carbon atoms, or halogen;

Z', when Z is $(C_1-C_4)$alkyl, is hydrogen, $(C_1-C_4)$alkyl, aralkyl of up to 8 carbon atoms, or halogen;

Z', when Z is halogen, is hydrogen, aralkyl of up to 8 carbon atoms, or halogen; and Z', when Z is hydrogen, is aralkyl of up to 8 carbon atoms, or halogen, or a salt of a compound of the above formula and a strong acid, an alkali metal cation, an alkaline earth metal cation, a transition metal cation, a quaternary ammonium cation, a quaternary phosphonium cation, or a primary, secondary, or tertiary organic base cation.

2. A compound according to claim 1 wherein Z is hydrogen.

3. A compound according to claim 2 wherein Z' is halogen.

4. A compound according to claim 1 wherein Z is $(C_1-C_4)$alkyl.

5. A compound according to claim 1 wherein Z is halogen.

6. A compound according to claim 5 wherein Z' is halogen.

7. A compound according to claim 5 wherein Z' is hydrogen.

8. A compound according to claim 1 wherein Z is cyano, carboxy, $(C_1-C_4)$carbalkoxy, or carbamoyl.

9. A compound according to claim 8 wherein Z' is $(C_1-C_4)$alkylsulfinyl.

10. A compound according to claim 8 wherein Z' is $(C_1-C_4)$alkylsulfonyl.

11. A compound according to claim 1 wherein Z' is halogen.

12. A compound according to claim 1 wherein Z' is $(C_1-C_4)$alkyl.

13. A salt of a compound according to claim 1 and a strong acid.

14. A salt of a compound according to claim 1 and an alkali metal cation, an alkaline earth metal cation, a transition metal cation, a quaternary ammonium cation, a quaternary phosphonium cation, or a primary, secondary, or tertiary organic base cation.

15. A compound according to claim 4 wherein Z' is halogen.

References Cited

FOREIGN PATENTS 1,193,050   5/1965   West Germany ____ 260—302 A

OTHER REFERENCES

Crow et al., J. Org. Chem., 30, 2660–5 (1965).

RICHARD J. GALLAGHER, Primary Examiner

U.S. Cl. X.R.

71—67; 106—15; 252—47.5; 260—45.75, 45.8, 299, 302 A; 424—200, 245, 248, 270